(12) United States Patent
Takano

(10) Patent No.: US 6,189,503 B1
(45) Date of Patent: Feb. 20, 2001

(54) PORTING ARRANGEMENT FOR DIRECT INJECTED ENGINE

(75) Inventor: Tomotaka Takano, Iwata (JP)

(73) Assignee: Yamaha Hatsudoki Kabushiki Kaisha, Iwata (JP)

( * ) Notice: Under 35 U.S.C. 154(b), the term of this patent shall be extended for 0 days.

(21) Appl. No.: 09/309,962

(22) Filed: May 11, 1999

(30) Foreign Application Priority Data

May 14, 1998 (JP) ................................ 10-130927

(51) Int. Cl.[7] ........................................ F02M 35/10
(52) U.S. Cl. .................. 123/302; 123/298; 123/188.14
(58) Field of Search .................................. 123/302, 308, 123/298, 432, 193.3, 193.5, 184.45, 184.52, 188.14

(56) References Cited

U.S. PATENT DOCUMENTS

| | | | |
|---|---|---|---|
| 5,775,288 | * 7/1998 | Suzuki et al. .................. | 123/302 |
| 5,915,353 | * 6/1999 | Matsumura .................... | 123/298 |
| 5,960,768 | * 10/1999 | Monnier ...................... | 123/298 |
| 6,006,719 | * 12/1999 | Matsumura .................... | 123/308 |
| 6,009,849 | * 1/2000 | Yamamoto et al. ............. | 123/298 |

* cited by examiner

Primary Examiner—Henry C. Yuen
Assistant Examiner—Hieu T. Vo
(74) Attorney, Agent, or Firm—Knobbe, Martens, Olson & Bear LLP

(57) ABSTRACT

An improved porting and cylinder head arrangement for a multi-valve overhead valve internal combustion engine. The porting arrangement in the cylinder head permits the use of two separate and relatively large intake passages beneath which a fuel injector can be conveniently positioned without obstruction of the shape or configuration of these intake passages. A separate control valve body is fixed to the cylinder head for controlling the flow through the intake passages independently of each other while providing a common intake that can be valved by a single throttle valve.

10 Claims, 7 Drawing Sheets

PORTING ARRANGEMENT FOR DIRECT INJECTED ENGINE

BACKGROUND OF THE INVENTION

This invention relates to a porting arrangement for a direct injected internal combustion engine and more particular to an improved cylinder head arrangement for such an engine.

Many techniques are employed in order to improve the performance and also efficiency of internal combustion engines. A number of these techniques relate to the design of the cylinder head and particularly the porting and combustion chamber configuration therein. For example, it is becoming common practice to use multiple intake and multiple exhaust valves and one or twin overhead cam shafts for operating these valves. This obviously complicates the cylinder head construction.

Furthermore, it has been proposed to utilize various tuning arrangements so that each intake passage can function independently of the others under some running conditions and/or so as to induce turbulence under one running condition without increasing flow resistance at high speed high load conditions. Finally, direct cylinder injection also can be employed in order to improve engine performance.

However, if all of these features are used in combination, with prior cylinder head constructions some sacrifices had to be made. The sacrifices either involve putting the fuel injector at other than an optimum location and/or changing the configuration of the intake passages to accommodate the fuel injector and in some instances using Siamese rather than separate intake passages.

It is, therefore, a principal object of this invention to provide an improved cylinder head and porting arrangement for an internal combustion engine wherein multiple valves, separate intake passage tuning and direct cylinder injection may all be employed without restricting the breathing capacity of the engine.

It is a further object of this invention to provide an improved porting arrangement for an overhead cam multiple valve fuel injected internal combustion engine.

SUMMARY OF THE INVENTION

This invention is adapted to be embodied in a cylinder head for an internal combustion engine having a lower surface adapted to be affixed in engagement with a corresponding surface of a cylinder block. The cylinder head has a recessed area in its lower surface cooperating with a cylinder bore in the cylinder block to form, in part, a combustion chamber. A pair of valve seats are formed in the cylinder head recess on one side thereof. A pair of intake passages each extending from a respective one of the intake ports to a pair of spaced apart inlet openings formed in an outer surface of the cylinder head. A fuel injector is mounted in the cylinder head below the intake passages and disposed therebetween. The fuel injector is received in an opening formed in the cylinder head that is disposed between and below the intake passage openings for receiving a fuel injector for spraying directly into the cylinder head recess.

DETAILED DESCRIPTION OF THE PREFERRED EMBODIMENT OF THE INVENTION

Figure 1:
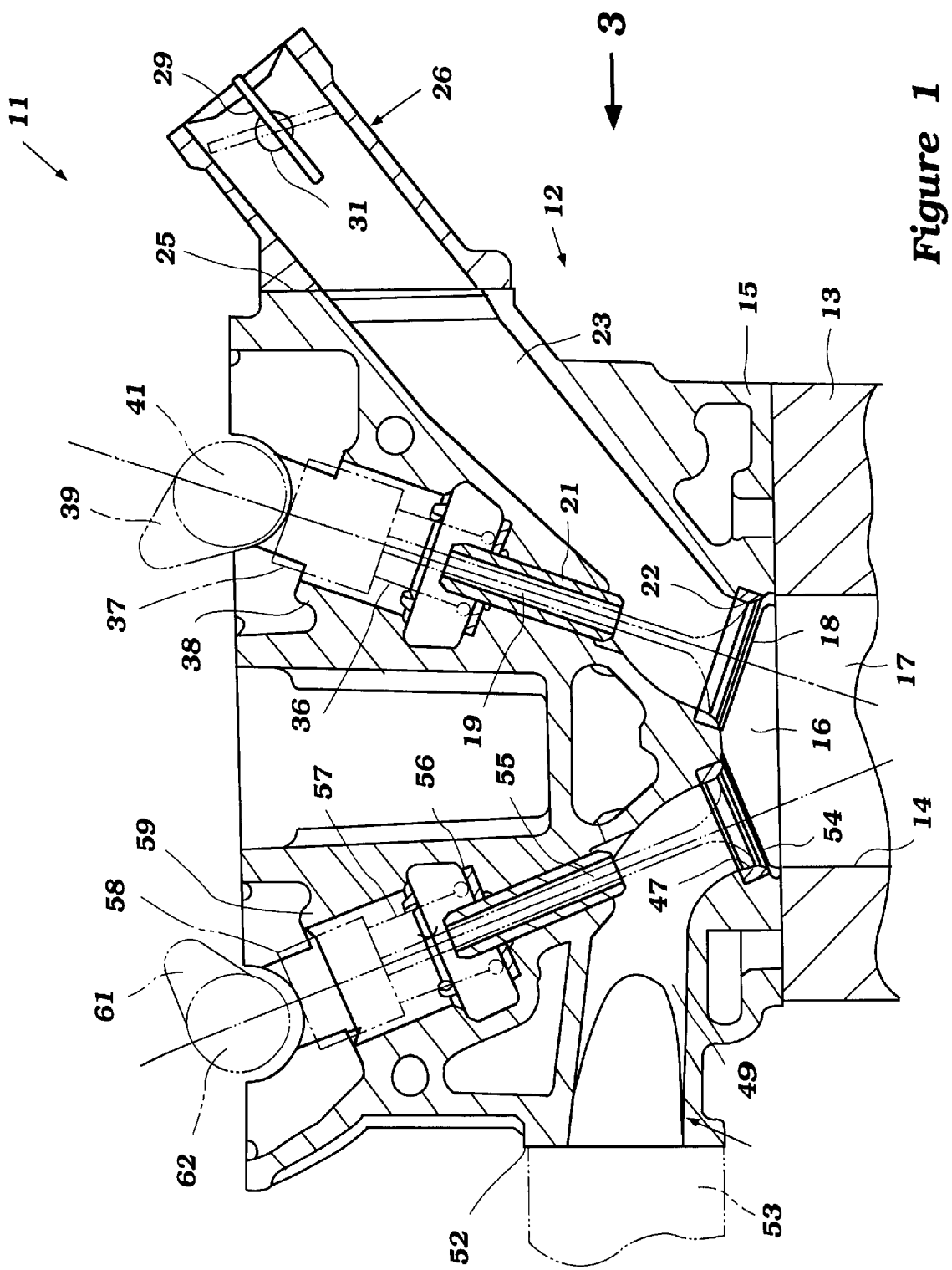
FIG. 1 is a cross-sectional view taken through a portion of a cylinder head of an internal combustion engine constructed in accordance with an embodiment of the invention and with some of the components removed and others shown in phantom.
Figure 2:
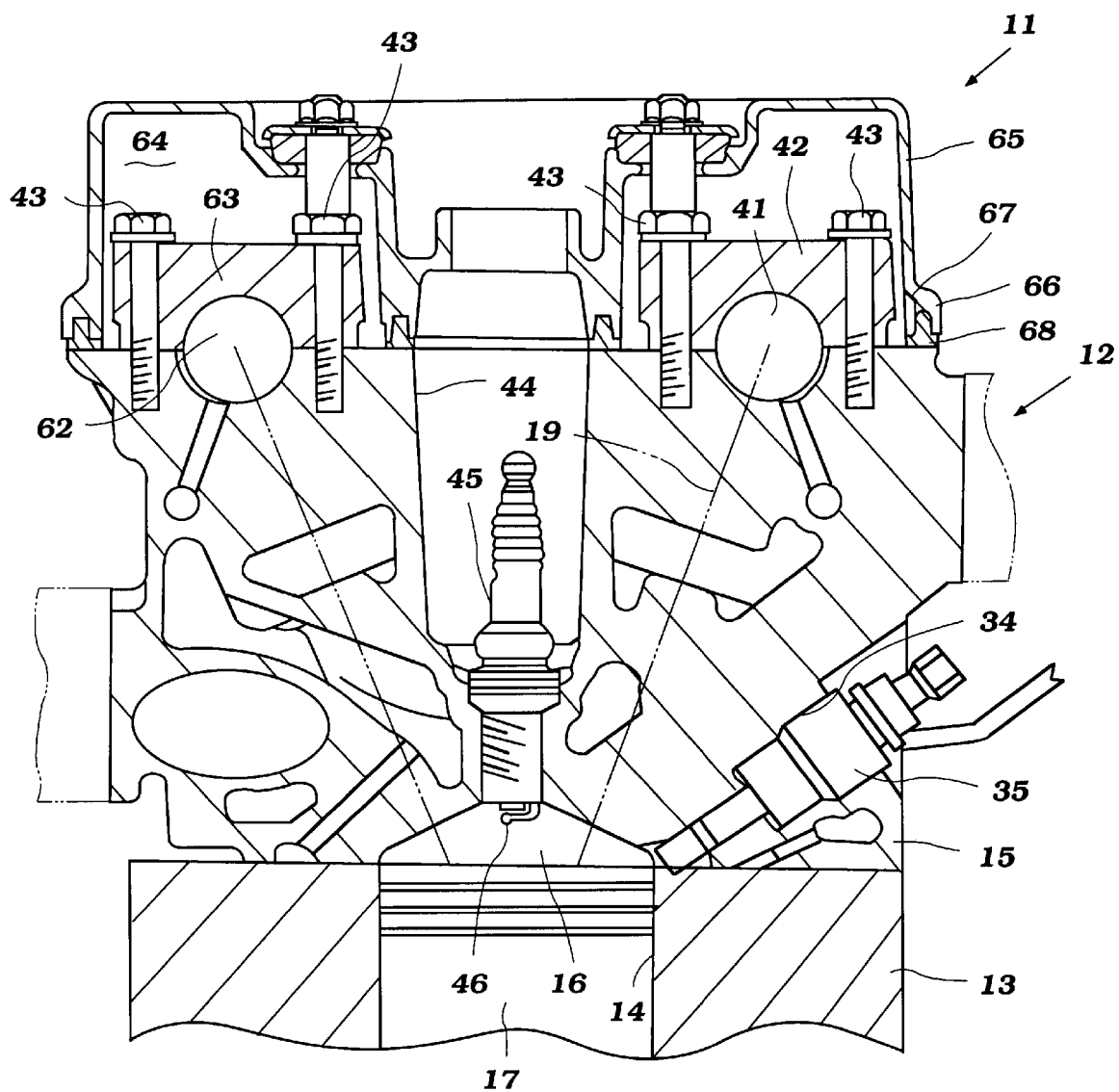
FIG. 2 is a cross-sectional view taken along a plane parallel to that of FIG. 1 but passing through the center of the cylinder bore of the cylinder block.

Referring now in detail to the drawings and initially primarily to FIGS. 1 and 2, an internal combustion engine constructed in accordance with an embodiment of the invention is shown partially and is identified generally by the reference numeral 11. The invention deals, as should be apparent from the foregoing description, primarily with the construction of the cylinder head assembly, indicated by the reference numeral 12 and the porting arrangement therefore. Therefore, where components of the engine are not necessary to illustrate this construction, nor permit those skilled in the art to practice the invention, they have not been illustrated nor will be they described except generally. Therefore, where any components of the engine 11 do not appear in the drawings or are not described herein, those skilled in the art may resort to any suitable constructions with which to practice the invention.

The cylinder head assembly 12 is attached to a cylinder block 13 in any suitable manner. The cylinder block 13 is formed with one or more cylinder bores 14 which are closed by a main cylinder head member 15 of the cylinder head assembly 12. The construction shown in the figures represents a multiple cylinder, incline type engine. It should be readily apparent, however, to those skilled in the art how to practice the invention with engines having other cylinder numbers and other configurations.

The cylinder head member 15 has recesses 16 in its lower surface which cooperate with the cylinder bores 14 and pistons 17 that reciprocate therein to form the variable volume chambers of the engine which will be at times referred to as the "combustion chambers". In fact, at top dead center position as shown in FIG. 2, the cylinder head recess 16 forms substantially the entire volume of the combustion chamber and at times this reference numeral will be used to designate the combustion chamber.

In the illustrated embodiment, the engine 11 is of the multiple valve per cylinder type and includes at least two intake valves 18 which have stem portions 19 that are supported for reciprocation in valve guides 21 in the cylinder head member 15. These intake valves 18 control the opening and closing of intake ports 22 that are formed at the termination of a pair of side-by-side intake passages 23 which are formed the cylinder head member 15 and which are totally separated from each other by a wall, shown in FIG. 5 and indicated by the reference numeral 24. This wall also appears in FIG. 3.

It will be seen that the intake passages 23 extend outwardly and terminate in openings formed in an external surface 25 of the cylinder head member 16. A control valve body, indicated generally by the reference numeral 26 is affixed to this surface 25 and has branch passages 27 which are separated also from each other for a portion of their length by an integral wall 28 which forms an extension of the cylinder head wall 27.

The control valve body 26 mates with a suitable intake manifold and air supply system which is not shown. This system may include one or more speed controlling throttle valves.

The control valve body 26, on the other hand, includes a butterfly type control valve 29 which is mounted on a control valve shaft 31 in the body 26 in only one of the two intake passages 27 thereof associated with each cylinder. Thus, by opening or closing the control valve 29, the flow through one of the intake valve seats 22 can be either opened or restricted.

Figure 5:
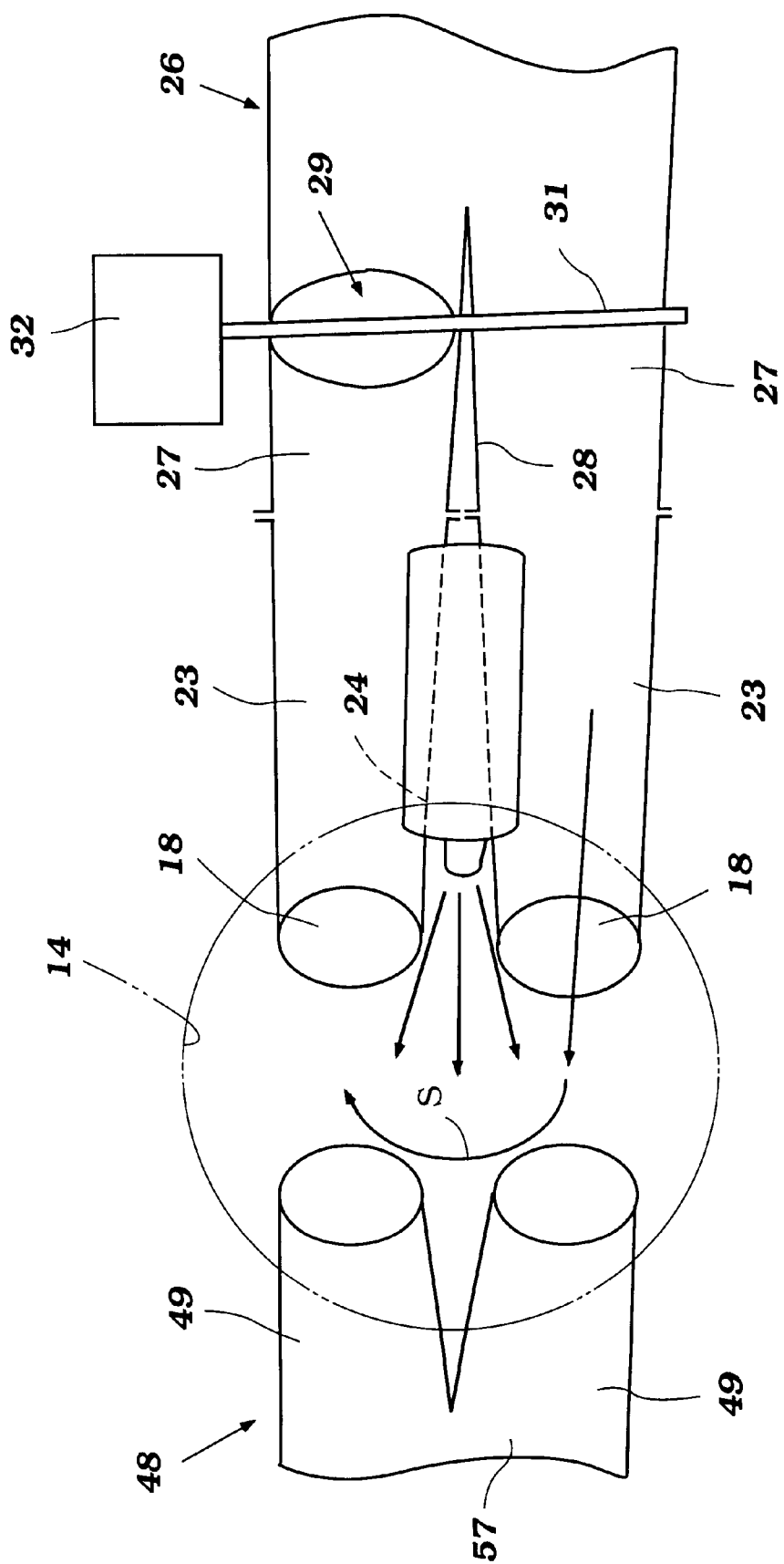
FIG. 5 is a partially schematic top plan view showing the porting arrangement associated with the engine.

By restricting the flow through the passage in which the control valve 29 is positioned, a swirl indicated by the arrow S in FIG. 5 can be generated. This can be used to promote turbulence under low and mid range operation so as to improve flame propagation and, at times, to control stratification within the combustion chamber 16. Rather than swirl, tumble can be created by utilizing a properly configured and located valve. In addition both swirl and tumble can be created either simultaneously or sequentially.

The control valve 29 is operated by a servo motor 32 that is affixed to the control valve shaft 31 and which is controlled by a suitable EMU in connection with a desired control strategy.

Figure 3:
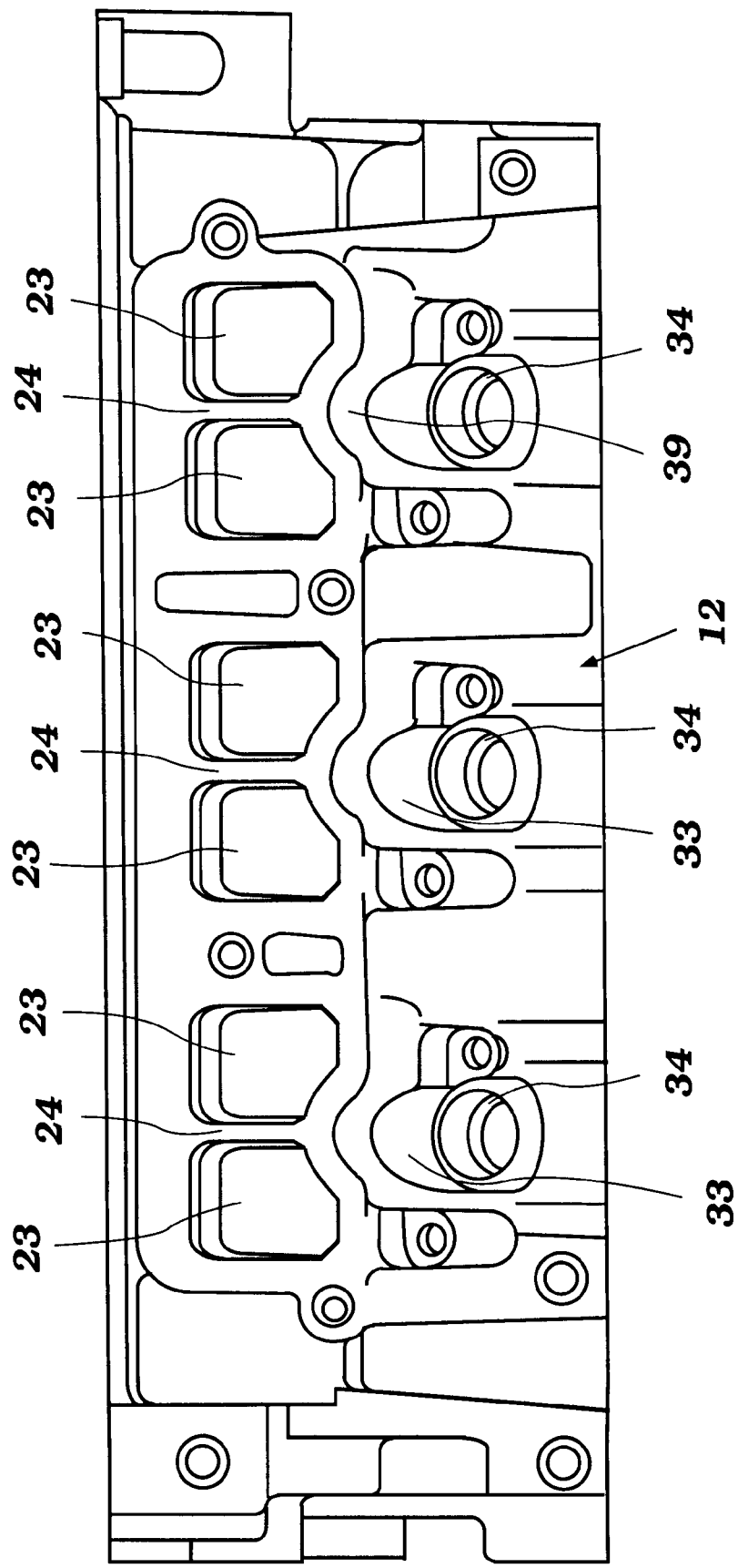
FIG. 3 is a side elevational view of the cylinder head with its components removed and looking in the direction of the arrow 3 in FIG. 1.
Figure 6:
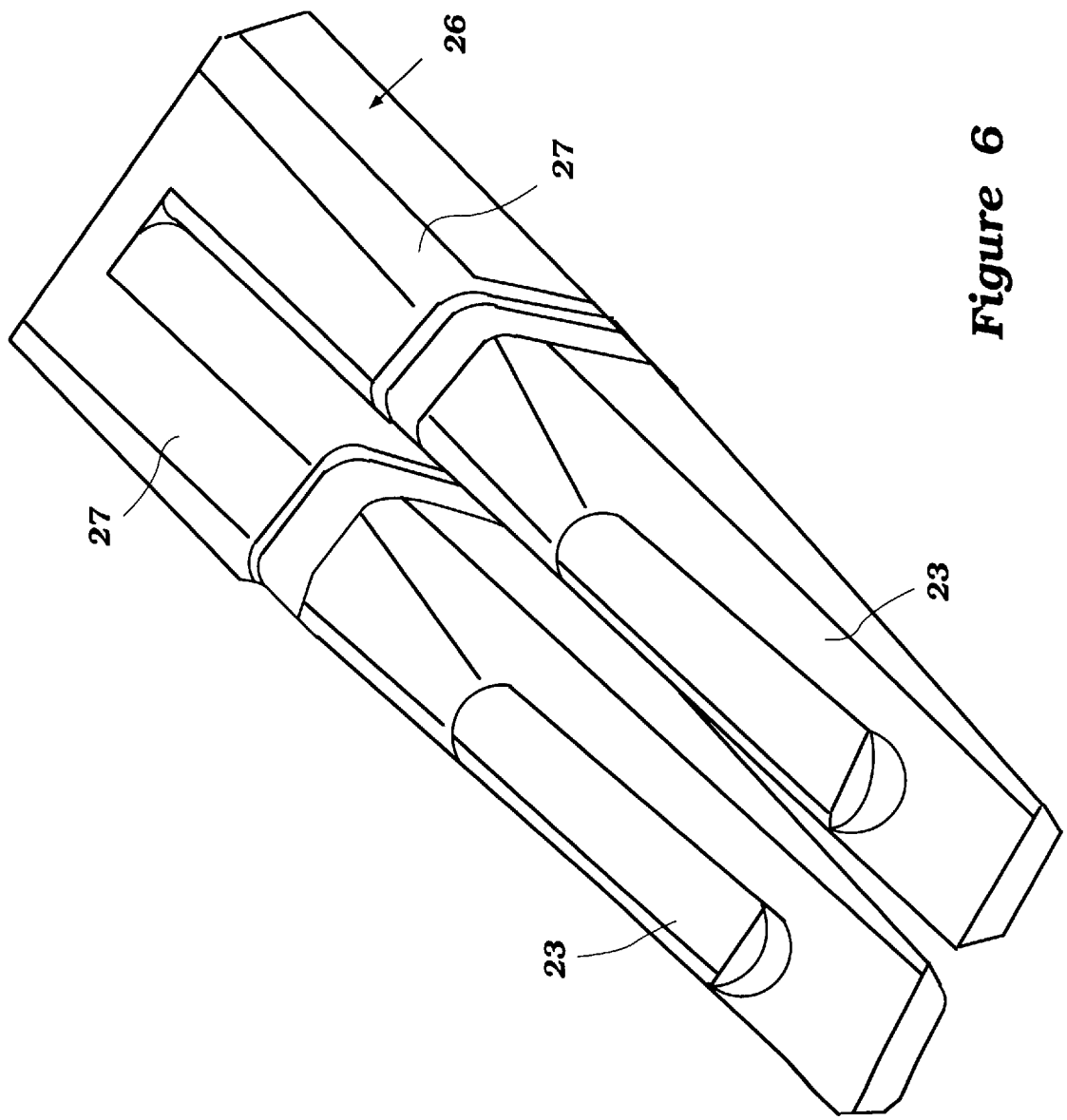
FIG. 6 is a perspective view showing the porting configuration and looking from above and outwardly from the center of the cylinder bore.
Figure 7:
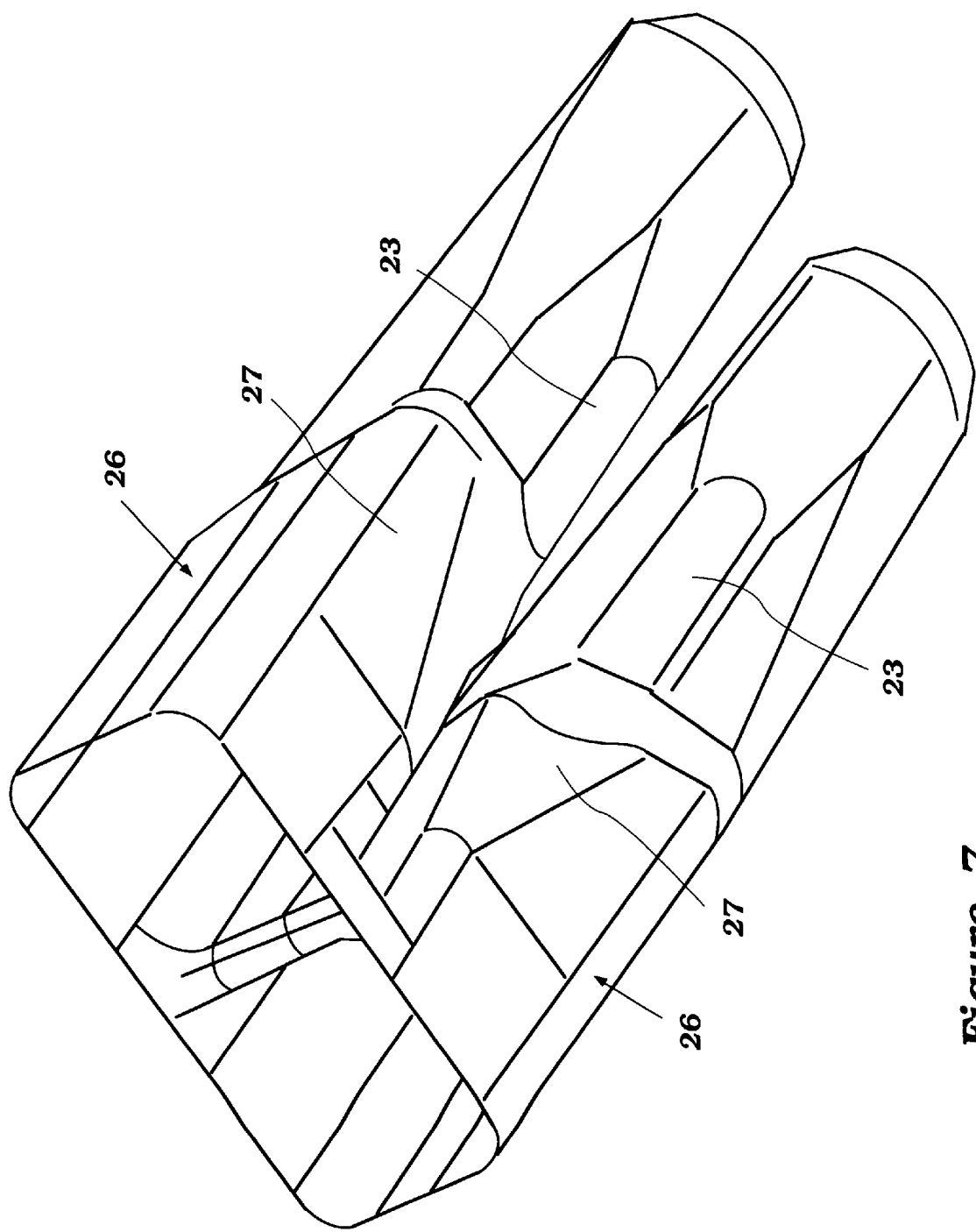
FIG. 7 is a perspective view looking generally in the opposite direction from FIG. 6 and showing the same components.

As may be seen best in FIG. 3 and FIGS. 6 and 7, the cylinder head intake passages 27 have a generally rectangular configuration that merges toward their discharge ends at the ports 22 in a circular or cylindrical configuration. By using this type of configuration, it is possible to obtain a larger flow area without making the cylinder head unduly large and also to provide a recessed area 33 (see FIG. 3) that extends beneath and between the two intake passages 23 for each cylinder.

Figure 4:
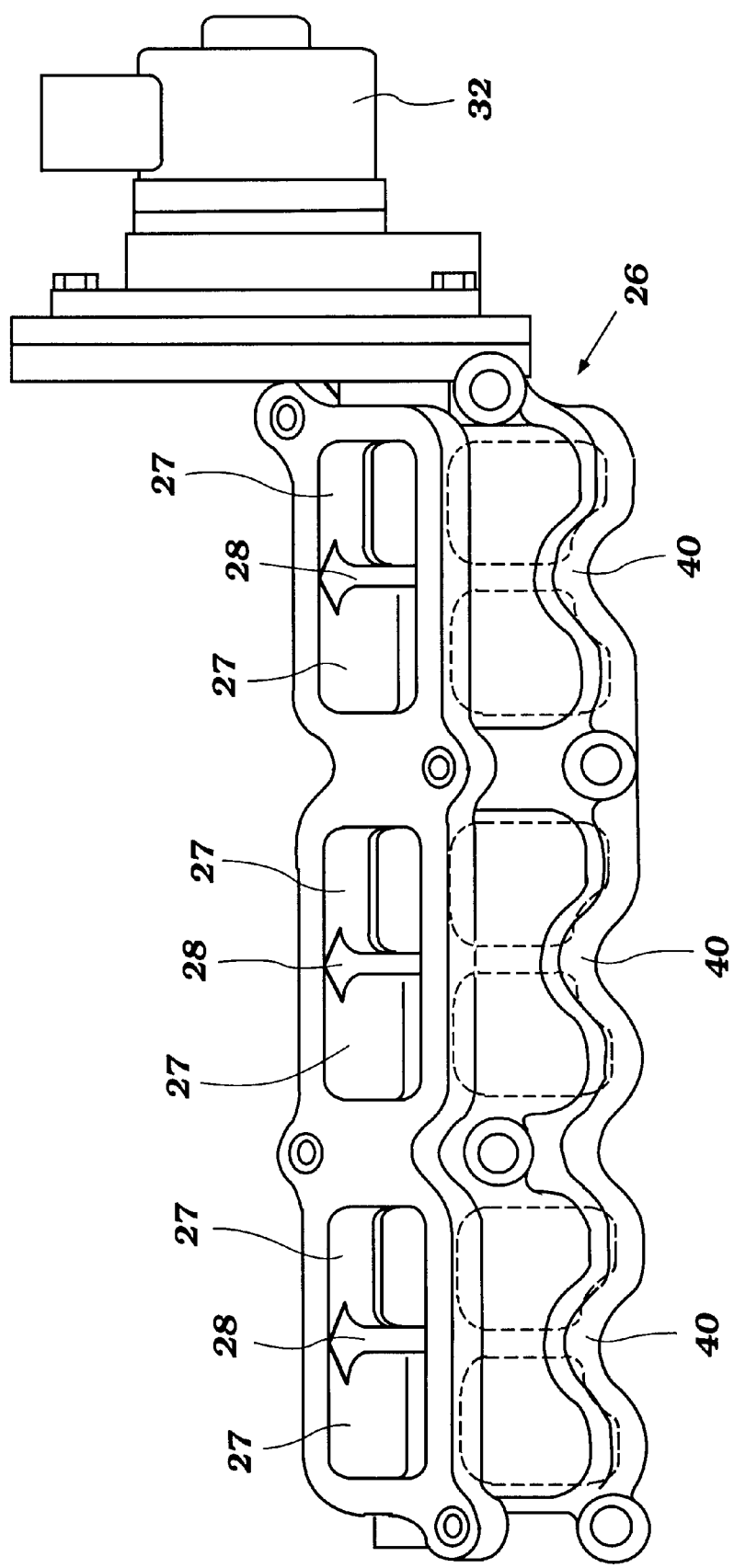
FIG. 4 is a view looking in the same direction as FIG. 3 but shows the control valve body arrangement associated with the induction system and which forms a continuation of the cylinder head intake passages.

This recessed area 33 permits the formation of an opening 34 which receives a fuel injector 35 as best seen in FIG. 2. Thus, the fuel injector 35 can be positioned so as to have the optimum spray pattern within the combustion chamber. The control valve body 26 has like recesses 40 (FIG. 4) for a similar purpose.

Referring now primarily to FIG. 1, the intake valves 18 are urged to their closed positions by means of coil spring assemblies 36 which are loaded between a surface of the cylinder head member and a keeper retainer assembly which is not shown but which is affixed to the upper end of the stem portion 19 of the intake valves 18.

Thimble tappets 37 are received in bosses 38 formed in the cylinder head member 15 and bear against these keeper retainer assemblies. The thimble tappets 37 are actuated by the lobes 39 of an intake cam shaft 41 that is journaled for rotation in a suitable manner within the cylinder head member 15. This intake cam shaft is driven at one half crankshaft speed by a suitable timing drive, as is well known in the art.

As best seen in FIG. 2, the intake cam shaft 41 is journaled by bearing surfaces formed in the cylinder head member 15 and by bearing caps 42 that are affixed thereto by threaded fasteners 43.

Centrally of the cylinder head member 15 there is provided a spark plug well 44 in which a spark plug 45 is received. The spark plug 45 is positioned so that its spark gap 46 lies substantially on the axis of the cylinder bore 14 and hence, generally at the center of the combustion chamber 16. This ensures equal flame propagation and complete combustion in the combustion chamber.

The burnt charge is discharged from the combustion chamber 16 through exhaust ports 47 which are formed at the inlet ends of a Siamesed type exhaust passage, indicated generally by the reference numeral 48. This passage 48 has individual portions 49 that merge into a common discharge opening 51 formed in an outer surface 52 of the cylinder head member 15. An exhaust manifold, shown schematically at 53 is affixed to the surface 52 and collects the exhaust gases for discharge to the atmosphere in a known manner.

The exhaust ports 47 are valved by the heads of exhaust valves 54. Like the intake valves 18, the exhaust valves 54 have stem portions 55 that are supported within valve guides 56 in the cylinder head 15. Again, coil compression spring 57 act against the cylinder head member 15 and keep a retainer assembly affixed to the upper ends of the valve stems 55 for holding them in closed positions.

Thimble tappets 58 are slidably supported in bores formed in bosses 59 of the cylinder head member 15 and engage these keeper retainer assemblies. The lobe 61 of an exhaust cam shaft 62 cooperate with the thimble tappets 58 for opening exhaust valves 54 in a well known manner. the exhaust cam shaft 62 is, like the intake cam shaft 41, driven at one half crankshaft speed by any suitable drive.

As seen in FIG. 2, the exhaust cam shaft 62 is also journaled in the cylinder head member 15 by integral bearing surfaces. Bearing caps 63 are affixed thereto by the threaded fasteners 43.

It should be noted that the cam shafts 41 and 62 are journaled in a cam chamber 64 that is formed by the cylinder head member 15 and a cam cover 65 which is affixed thereto also by the threaded fasteners 43. The cam cover 65 has a flange portion 66 which is grooved at 67 so as to receive a seal 68 that is sealingly engaged with the exterior surface of the cylinder head member 15 around this cam chamber 64.

Thus, from the foregoing description it should be readily apparent to those skilled in the art that the described cylinder head and porting arrangement provides a very large effective flow area without interfering with the desired placement of the fuel injector. Also, the arrangement utilizing the control valve assembly 26 permits desired types of turbulence to be generated in one or if desired both of the intake passage but different from each other. This is done why still permitting the use of a common intake opening that can be controlled by a single throttle valve.

Of course, the foregoing description is that of a preferred embodiment of the invention and various changes and modifications may be made without departing from the spirit and scope of the invention, as defined by the appended claims.

What is claimed is:

1. A cylinder head for an internal combustion engine having a lower surface adapted to be affixed in engagement with a corresponding surface of a cylinder block and having a recess in said surface cooperating with a cylinder bore in said cylinder block to form, in part, a combustion chamber, a pair of intake valve ports formed in said cylinder head recess on one side thereof, a pair of intake passages each extending from a respective one of said intake ports to a pair of spaced apart inlet openings formed in an outer surface of said cylinder head, a fuel injector mounted in said cylinder head below said intake passages and disposed therebetween and received in an opening formed in said cylinder head that is disposed in a recessed area of said cylinder head formed in said cylinder head between and below said intake passage openings and spaced inwardly from said outer surface toward said combustion chamber for receiving a fuel injector for spraying directly into said cylinder head recess.

2. A cylinder head for an internal combustion engine having a lower surface adapted to be affixed in engagement with a corresponding surface of a cylinder block and having a recess in said surface cooperating with a cylinder bore in said cylinder block to form, in part, a combustion chamber, a pair of intake valve ports formed in said cylinder head recess on one side thereof, a pair of intake passages each extending from a respective one of said intake ports to a pair of spaced apart inlet openings formed in an outer surface of said cylinder head, said intake passage openings being generally rectangular in configuration, a fuel injector mounted in said cylinder head below said intake passages and disposed therebetween and received in an opening formed in said cylinder head that is disposed between and below said intake passage openings for receiving a fuel injector for spraying directly into said cylinder head recess.

3. A cylinder head as set forth in claim 2, wherein the rectangular configuration of the openings is relieved in the area of the fuel injector so as to provide a clearance therefore.

4. A cylinder head for an internal combustion engine having a lower surface adapted to be affixed in engagement with a corresponding surface of a cylinder block and having a recess in said surface cooperating with a cylinder bore in said cylinder block to form, in part, a combustion chamber, a pair of intake valve ports formed in said cylinder head recess on one side thereof, a pair of intake passages each extending from a respective one of said intake ports to a pair of spaced apart inlet openings formed in an outer surface of said cylinder head, a fuel injector mounted in said cylinder head below said intake passages and disposed therebetween and received in an opening formed in said cylinder head that is disposed between and below said intake passage openings for receiving a fuel injector for spraying directly into said cylinder head recess, and a manifold member affixed to the cylinder head surface forming said intake passage openings, said manifold member having a pair of inlet openings each registering with a respective one of said cylinder head openings and a common inlet opening.

5. A cylinder head as set forth in claim 4, further including a control valve positioned in one of the passages of said manifold member for controlling the flow into one of the cylinder head openings.

6. A cylinder head for an internal combustion engine having a lower surface adapted to be affixed in engagement with a corresponding surface of a cylinder block and having a recess in said surface cooperating with a cylinder bore in said cylinder block to form, in part, a combustion chamber, a pair of intake valve ports formed in said cylinder head recess on one side thereof, a pair of intake passages each extending from a respective one of said intake ports to a pair of spaced apart inlet openings formed in an outer surface of said cylinder head, a fuel injector mounted in said cylinder head below said intake passages and disposed therebetween and received in an opening formed in said cylinder head that is disposed between and below said intake passage openings for receiving a fuel injector for spraying directly into said cylinder head recess, and a pair of exhaust valve ports formed in said cylinder head recess on the other side thereof, a Siamese exhaust passage extending from said exhaust ports to a discharge opening formed in another outer surface of said cylinder head.

7. A cylinder head as set forth in claim 6, wherein said intake passage openings are generally rectangular in configuration.

8. A cylinder head as set forth in claim 7, wherein the rectangular configuration of the openings is relieved in the area of the fuel injector so as to provide a clearance therefore.

9. A cylinder head as set forth in claim 6, further including a manifold member affixed to the cylinder head surface forming the intake passage openings, said manifold member having a pair of inlet openings each registering with a respective one of said cylinder head openings and a common inlet opening.

10. A cylinder head as set forth in claim 9, further including a control valve positioned in one of the passages of said manifold member for controlling the flow into one of the cylinder head openings.

\* \* \* \* \*